(12) United States Patent
Laird et al.

(10) Patent No.: US 10,473,413 B1
(45) Date of Patent: Nov. 12, 2019

(54) PORTABLE DESCALING APPARATUS

(71) Applicants: Jordan Laird, Harrisburg, SD (US);
Brad Hyronimus, Beresford, SD (US);
John W. Finger, Beresford, SD (US)

(72) Inventors: Jordan Laird, Harrisburg, SD (US);
Brad Hyronimus, Beresford, SD (US);
John W. Finger, Beresford, SD (US)

(73) Assignee: Sioux Corporation, Beresford, SD (US)

(*) Notice: Subject to any disclaimer, the term of this patent is extended or adjusted under 35 U.S.C. 154(b) by 104 days.

(21) Appl. No.: 15/462,965

(22) Filed: Mar. 20, 2017

Related U.S. Application Data

(60) Provisional application No. 62/310,841, filed on Mar. 21, 2016.

(51) Int. Cl.
| | |
|---|---|
| B08B 9/032 | (2006.01) |
| F28G 1/16 | (2006.01) |
| F28G 15/02 | (2006.01) |
| B62B 1/02 | (2006.01) |
| B62B 1/00 | (2006.01) |

(52) U.S. Cl.
CPC .......... *F28G 1/163* (2013.01); *B08B 9/0325* (2013.01); *B62B 1/008* (2013.01); *B62B 1/02* (2013.01); *F28G 15/02* (2013.01); *B08B 2209/032* (2013.01)

(58) Field of Classification Search
CPC ... B08B 9/027; B08B 9/032; B08B 2209/032; F28G 9/00; F28G 1/163; F28G 15/02; C23G 3/04; B62B 1/02
See application file for complete search history.

(56) References Cited

U.S. PATENT DOCUMENTS

| | | | | | |
|---|---|---|---|---|---|
| 2,425,848 | A | * | 8/1947 | Vawter | B01D 25/00 210/167.31 |
| 4,787,348 | A | * | 11/1988 | Taylor | F02B 77/04 123/198 A |
| 4,991,608 | A | * | 2/1991 | Schweiger | F28G 9/00 134/102.2 |
| 5,289,837 | A | * | 3/1994 | Betancourt | F02M 25/00 134/111 |
| 5,429,306 | A | * | 7/1995 | Schneider | B05B 9/007 239/152 |
| 8,926,765 | B1 | | 1/2015 | Franzino | |
| 2002/0122730 | A1 | * | 9/2002 | Dexter | B08B 3/026 417/299 |
| 2006/0185113 | A1 | * | 8/2006 | Kloeppel | A47L 11/03 15/320 |
| 2007/0045203 | A1 | * | 3/2007 | Franzino | B08B 9/08 210/805 |
| 2009/0116972 | A1 | * | 5/2009 | Gilpatrick | B08B 3/026 417/234 |

* cited by examiner

*Primary Examiner* — Marc Lorenzi
(74) *Attorney, Agent, or Firm* — Jeffrey A. Proehl; Woods, Fuller, Shultz & Smith, PC

(57) ABSTRACT

A portable descaling apparatus for creating a forceful fluid flow through passages of a heat exchanger may comprise a cart, a fluid tank mounted on the cart and having an interior configured to hold a quantity of fluid, a fluid pump mounted on the cart and being configured to pump fluid from the tank under pressure and a pump motor mounted on the cart and being connected to the fluid pump to operate the pump.

6 Claims, 5 Drawing Sheets

PORTABLE DESCALING APPARATUS

REFERENCE TO RELATED APPLICATIONS

This application claims the priority of U.S. Provisional Patent Application No. 62/310,841, filed Mar. 21, 2016, which is hereby incorporated in its entirety.

BACKGROUND

Field

The present disclosure relates to descaling apparatus and more particularly pertains to a new portable descaling apparatus for moving fluid through the internal passages of a device such as a heat exchanger to remove scale and debris from the passages.

SUMMARY

In one aspect, the present disclosure relates to a portable descaling apparatus for creating a forceful fluid flow through passages of a heat exchanger. The apparatus may comprise a cart, a fluid tank mounted on the cart and having an interior configured to hold a quantity of fluid, a fluid pump mounted on the cart and being configured to pump fluid from the tank under pressure and a pump motor mounted on the cart and being connected to the fluid pump to operate the pump.

In another aspect, the disclosure relates to a portable descaling apparatus for creating a forceful fluid flow through passages of a heat exchanger between an inlet connection and an outlet connection of the heat exchanger. The apparatus may comprise a cart, a fluid tank mounted on the cart and having an interior configured to hold a quantity of fluid, with the tank having a tank inlet and a tank outlet. The apparatus may also comprise a fluid pump mounted on the cart and being fluidly connected to the tank outlet to pump fluid from the tank under pressure, with the pump having an output, and a pump motor mounted on the cart and being connected to the fluid pump to operate the pump. The apparatus may also include an input assembly configured to receive fluid into the apparatus from the heat exchanger during fluid circulation, and may include an input connector mounted on the cart and being configured to removably connect to the output connection of the heat exchanger to fluidly connect the tank to the heat exchanger and a conduit fluidly connecting the input connector to the tank inlet. The apparatus may further include an output assembly configured to receive fluid from the output of the pump, and may include an output connector mounted on the cart and being configured to removably connect to the input connection of the heat exchanger to fluidly connect the pump to the heat exchanger and a conduit fluidly connecting the output connector to the pump outlet.

In still another aspect, the disclosure relates to a descaling system which may comprise a heat exchanger with a pair of connections in fluid communication with a fluid passage through the heat exchanger, with the connections including an inlet connection and an outlet connection. The system may also include a portable descaling apparatus for creating a forceful fluid flow through passages of a heat exchanger, and the apparatus may include a cart, a fluid tank mounted on the cart and having an interior configured to hold a quantity of fluid, with the tank having a tank inlet and a tank outlet. The apparatus may also include a fluid pump mounted on the cart and being fluidly connected to the tank outlet to pump fluid from the tank under pressure, with the pump having an output, and a pump motor mounted on the cart and being connected to the fluid pump to operate the pump. The apparatus may further include an input assembly configured to receive fluid into the apparatus from the heat exchanger during fluid circulation, and the input assembly may comprise an input connector mounted on the cart and being removably connected to the output connection of the heat exchanger to fluidly connect the tank to the heat exchanger and a conduit fluidly connecting the input connector to the tank inlet. The apparatus may also include an output assembly configured to receive fluid from the output of the pump, and the output assembly may comprise a output connector mounted on the cart and being removably connected to the input connection of the heat exchanger to fluidly connect the pump to the heat exchanger and a conduit fluidly connecting the output connector to the pump outlet.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
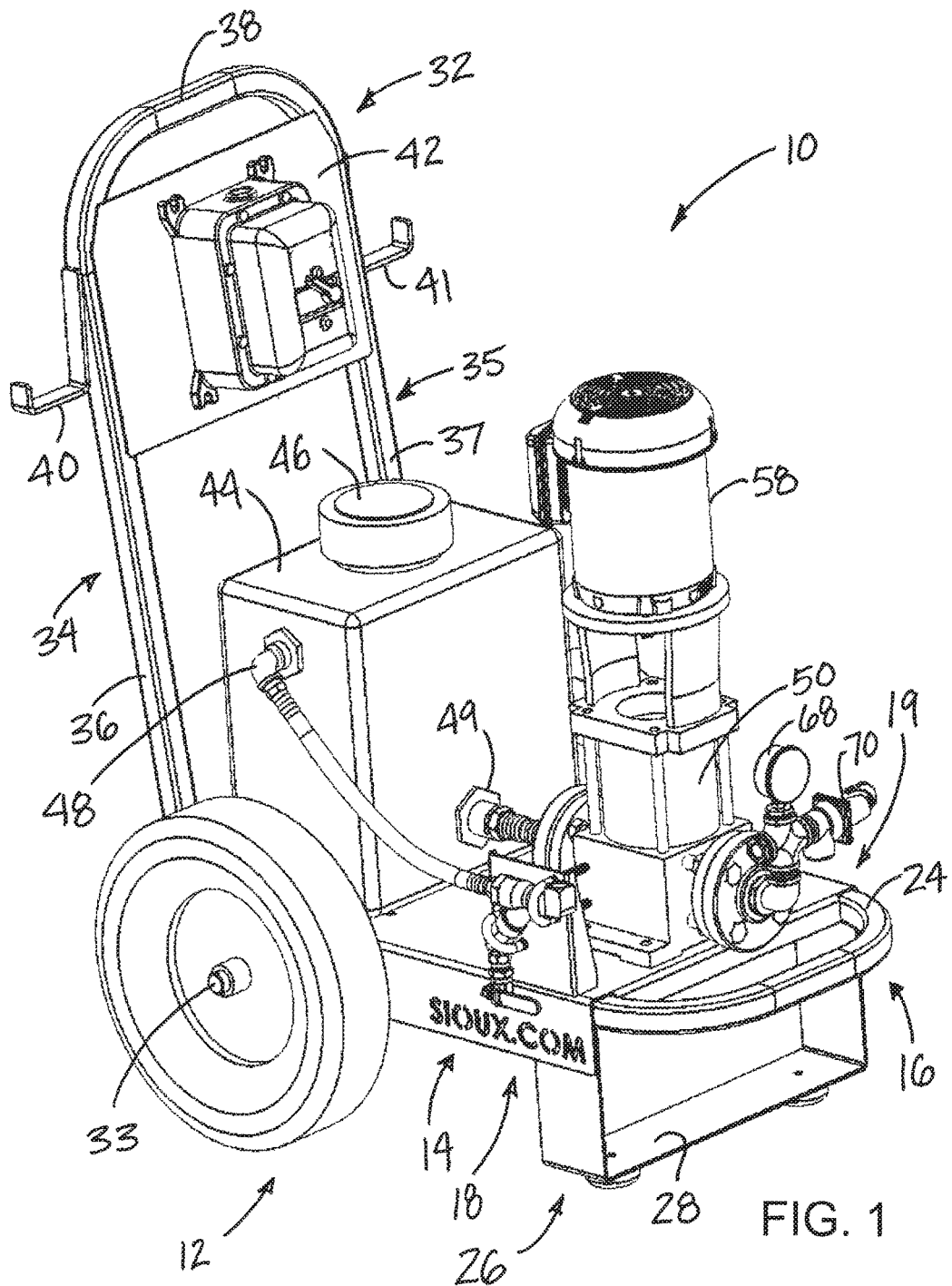
FIG. 1 is a schematic perspective view of a new portable descaling apparatus according to the present disclosure.
Figure 2:
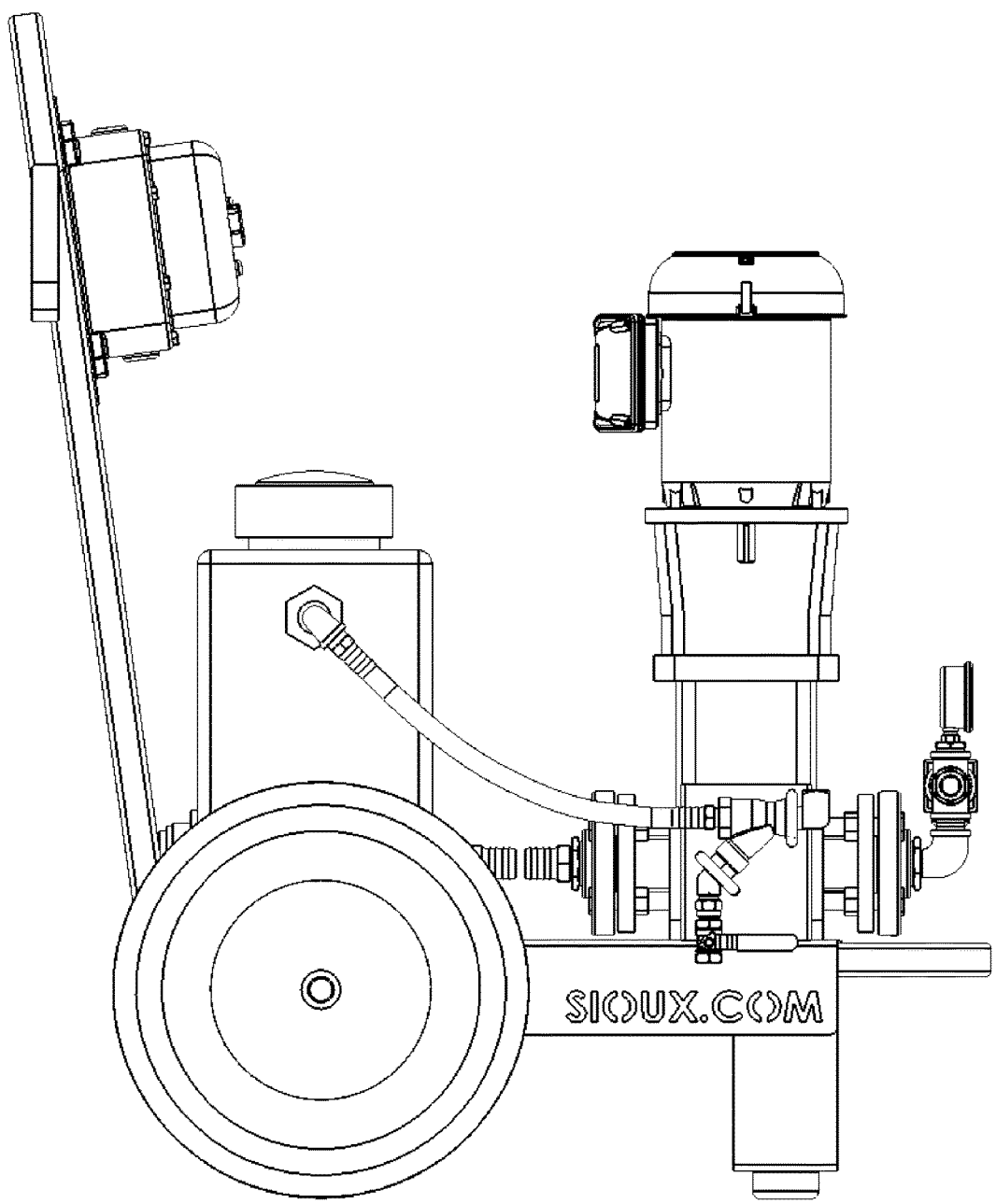
FIG. 2 is a schematic side view of the apparatus, according to an illustrative embodiment.
Figure 3:
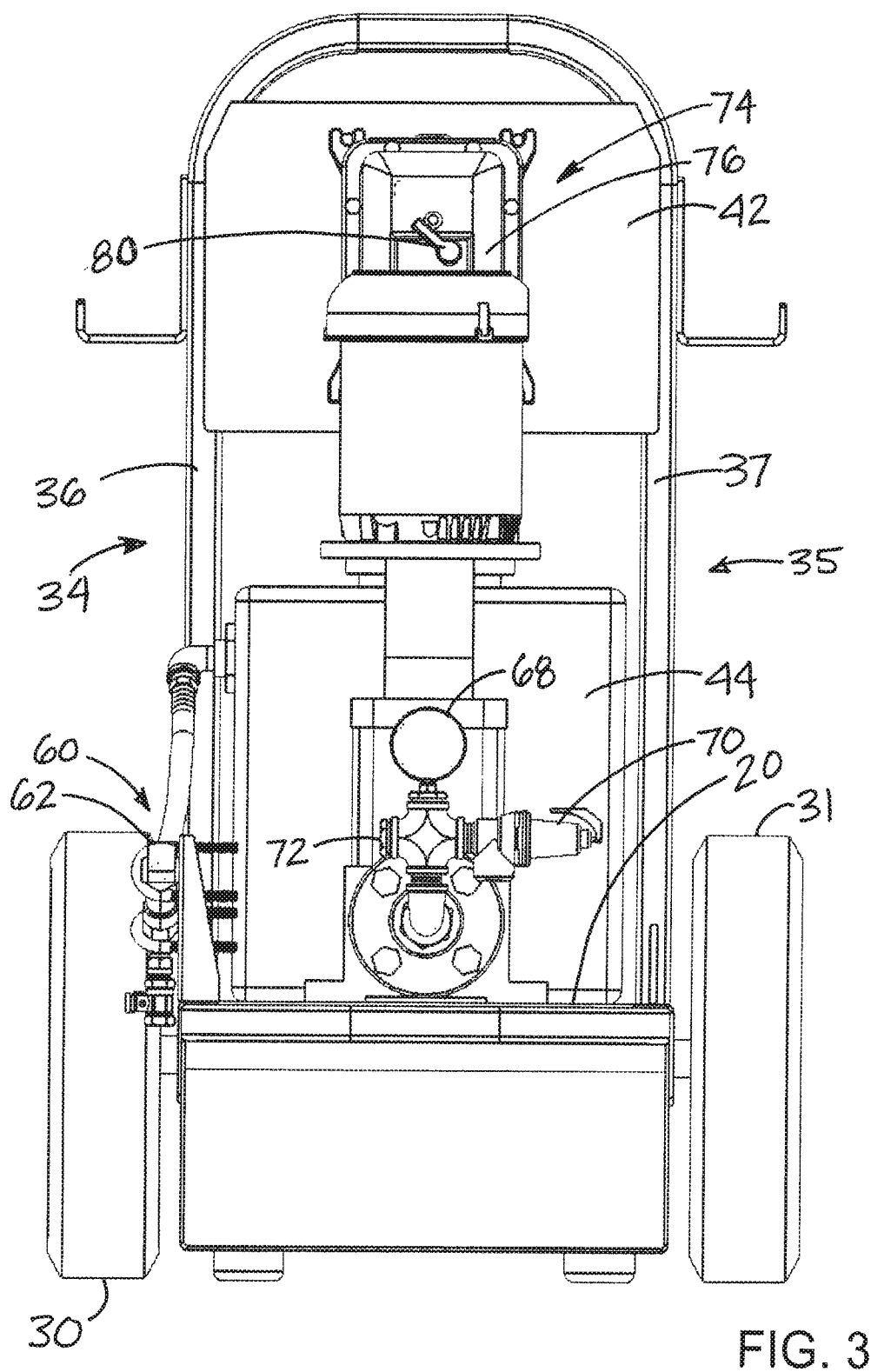
FIG. 3 is a schematic front view of the apparatus, according to an illustrative embodiment.
Figure 4:
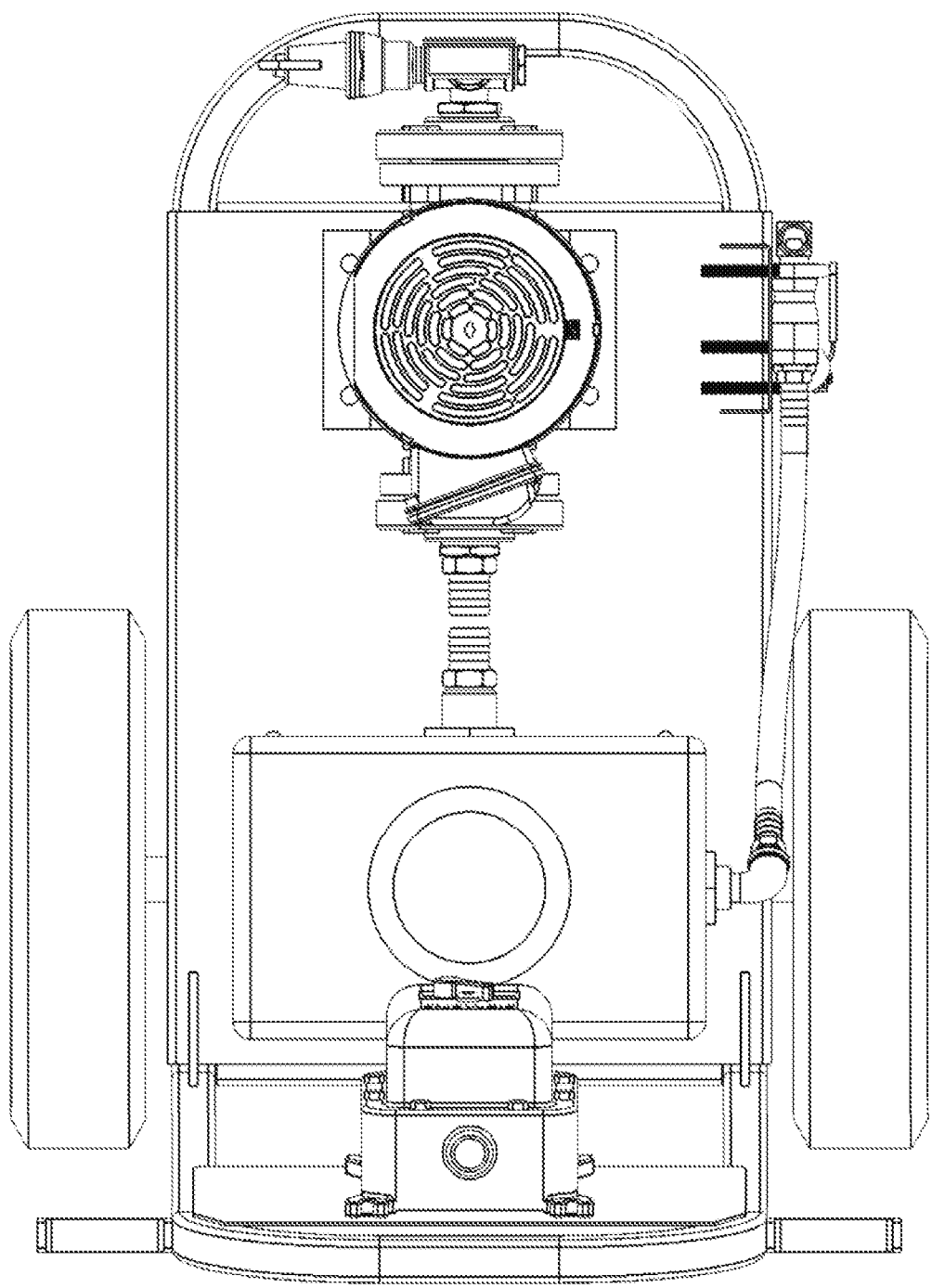
FIG. 4 is a schematic top view of the apparatus, according to an illustrative embodiment.
Figure 5:
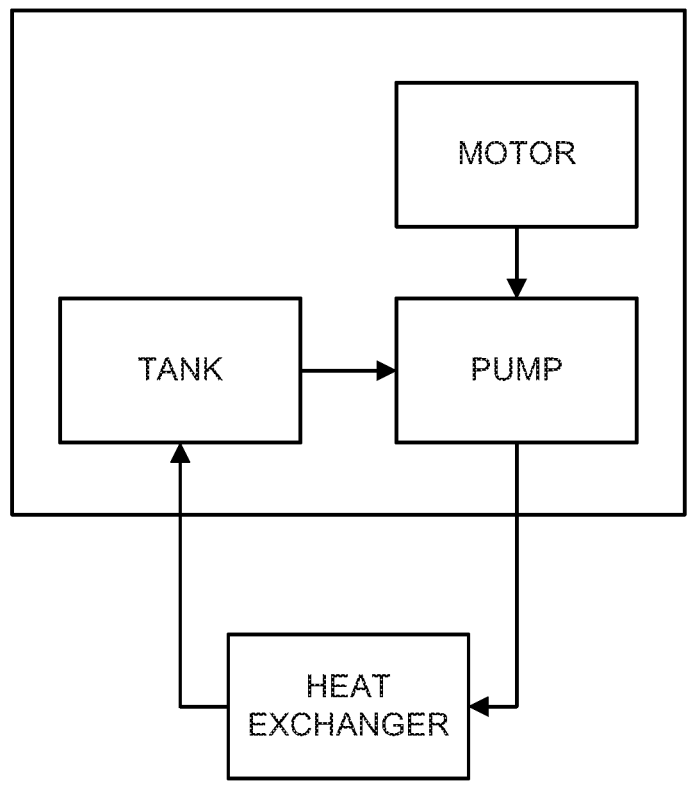
FIG. 5 is a schematic diagram of the apparatus and a heat exchanger, according to an illustrative embodiment.

With reference now to the drawings, and in particular to FIGS. 1 through 5 thereof, a new portable descaling apparatus embodying the principles and concepts of the disclosed subject matter will be described.

The applicant has recognized the usefulness of using the flow of pressurized fluid, such as water, to remove scale and other debris from the interior surfaces of devices such as heat exchangers. Movement of pressurized fluid through the interior passages of the heat exchanger tends to dislodge the scale and debris from the surfaces, and also move the scale and debris out of the passages for disposal.

The applicant has thus devised a portable descaling apparatus 10 for creating a forceful fluid flow through passages of a device such as the aforementioned heat exchanger 1 for the purpose of dislodging and removing scale and other debris in the internal passages of the heat exchanger. The apparatus 10 may be employed to form a closed circuit for fluid flow through the apparatus and the internal passages of the device such that the fluid is introduced into the internal passages at high pressure, and then returned to the apparatus and re-pressurized and again reintroduced into the internal passages of the device.

In an illustrative embodiment, shown in FIGS. 1 through 5, the apparatus 10 includes a cart 12 for supporting and carrying about various elements of the apparatus in a convenient manner. The cart 12 may include a platform 14 with a front 16 generally oriented towards the normal forward direction of movement of the apparatus, and a rear 17 generally directed away from the normal forward direction of movement, although it should be understood that the cart may be moved in virtually any direction. The platform 14 may have a pair of opposite sides 18, 19 and may also have an upper surface 20. In some embodiments, the platform 14 may include a frame 22 which may include a forward loop 24 protruding forwardly at the front 16 of the platform. The platform 14 may also include a forward leg structure 26 for supporting the frame in a raised relationship with respect to a ground surface on which the apparatus is rested. In some embodiments, the forward leg structure 26 may comprise a substantially U-shaped leg member 28. The forward leg structure 26 may be located toward the front 16 of the platform, but may be positioned a short distance rearwardly of the front 16. The forward leg structure may have one or more pads mounted thereon for resting on a floor or ground surface, and the leg structure may provide some resistance to movement of the cart across the surface when the leg structure is rested on the surface.

The cart 12 may also include a pair of wheels 30, 31 which are mounted on the platform 14, and illustratively each of the wheels may be positioned at or adjacent to one of the respective sides 18, 19 of the platform. The pair of wheels 30, 31 may be mounted on an axle 33 which may be located below the platform and may be mounted on the platform by, for example, bushings or bearings mounted on the frame 22.

The cart 12 may also include a handle 32 which may be mounted on the platform 14 and may extend generally upwardly from the platform. In some embodiments, the handle 32 may be located toward the rear 17 of the platform. The handle 32 has lateral sides 34, 35 and may be formed of a first upright portion 36 located at the first lateral side 34 and a second upright portion 37 located at the second lateral side 35. The handle may also include a cross member portion 38 which extends between the first 36 and second 37 upright portions. Illustratively, the portions may comprise bars or tubes, but other elements may be employed. The handle 32 may also include a hook 40 for supporting connecting hoses and power cords, etc. In some embodiments a pair of the hooks 40, 41 may be employed with a first hook 40 being located on the first lateral side 34 of the handle and a second hook 41 being located on the second lateral side 35 of the handle, and the hooks may extending substantially opposite directions. The first hook 40 may be mounted on the first upright portion 36 and the second hook 41 may be mounted on the second upright portion 37. The handle may also include a mount panel 42 which may be mounted on and extend between the upright portions 36, 37.

The apparatus may also include a fluid tank 44 with an interior which is suitable to hold a quantity of liquid for the descaling and debris removal purposes. The fluid tank 44 may be mounted on the cart, and may be supported on the platform, such as on the upper surface of the platform. The tank 44 may be located between the wheels 30, 31 and may be positioned above the axle 33 such that approximately equal portions of the tank are located forward and rearward of the axle in a horizontal plane or direction. The fluid tank 44 may have an upper opening to provide access to the interior of the tank, and a cap 46 may be removably mounted on the tank to selectively close the upper opening. In some implementations, the upper opening may be employed to introduce fluid and any cleaning substances into the apparatus. The fluid tank may also include a tank inlet 48 for receiving fluid into the tank interior and a tank outlet 49 for fluid to leave the interior of the tank.

A fluid pump 50 may be included in the apparatus 10 for pumping fluid to circulate the fluid, and may pump fluid from the tank under pressure to and through a heat exchanger or other device to be cleaned. The fluid pump 50 may be mounted on the cart 12 and may be located on the platform. The fluid pump 50 may be located over the forward leg structure 26 and may be mounted on the platform above the leg structure 26. The fluid pump 50 may be in fluid communication with the tank interior through the tank outlet 49. The fluid pump may have an intake 52 which is connected to the tank outlet 49 by a conduit 54 for drawing the fluid from the tank interior into the pump. The fluid pump may have an output 56. The fluid pump may be of any suitable type, and for example comprises a centrifugal pump.

The apparatus 10 may further include a pump motor 58 which is connected to the fluid pump to operate the pump to pup the fluid. The pump motor 58 may be mounted on the pump, and may extend upwardly from the pump in a position that is substantially vertically above the pump, and thus also over the forward leg structure 26. An input assembly 60 of the apparatus 10 may be configured to receive fluid into the apparatus, such as fluid that has been circulated through a heat exchanger. The input assembly 60 may comprise an input connector 62 providing a connecting point for a hose or other conduit that is connected to the heat exchanger to be cleaned or descaled, and may be a connector that is designed to tolerate high pressures, although other types of connectors may also be employed. The input connector 62 may be connected to the fluid tank through a conduit 64. The input connector may be rigidly mounted on the cart, and on the platform, such as by a bracket that extends upwardly from the upper surface of the platform. In some embodiments, the input assembly may be located towards the front 16 of the platform.

An output assembly 66 of the apparatus 10 may be configured to receive fluid from the output 56 of the pump and form a second point of connection to a device such as a heat exchanger for circulation of the fluid through the heat exchanger. The output assembly 66 may be located at the output 56 of the pump. The output assembly 66 may include a pressure gauge 68 for measuring and displaying the pressure of the fluid output by the pump as being delivered to the device being cleaned or descaled. The output assembly 66 may also include a pressure relief valve 70 which may relieve pressure in the output assembly if the pressure exceeds a desired pressure value. The output assembly 66 may also include an output connector 72 which may be located toward the front 16 of the platform and may form the connection point between the apparatus 10 and a hose or conduit connected to the heat exchanger being cleaned or cleared of debris.

The apparatus 10 may also include power supply circuitry 74 which is mounted on the cart, and may be located on the mount panel 42 of the handle. The power supply circuitry 74 may include a housing 76 for isolating the circuitry therein from the environment in which the apparatus 10 is operating, and may be of an explosion-proof character. The power supply circuitry 74 may also include a motor starter circuit positioned in the housing for providing power to the motor that is suitable to begin operation of the motor. The power supply circuitry 74 may also include a power switch 80 mounted on the housing for providing a degree of operational control of the motor and thus the pump.

Significantly, the location of the tank over the axle not only helps to support the weight of the fluid in the tank in a stable manner when the apparatus is stationary, but also facilitates the easy shifting of the weight of the tank and fluid rearwardly of the axle when the handle 32 is tilted slightly rearwardly to provide a degree of counterbalance to the significant weight of the motor 58 and the pump 50, while still maintaining at least a portion of the weight of the tank and contents over the axle. Further, embodiments in which the location of the tank is substantially centered above the axle provides substantial adjustments of the weight distribution forwardly and rearwardly of the axle to be made with only slight changes in the tilt angle of the handle and platform. Additionally, the positioning of the weight of the pump and the motor over the forward leg structure tends to apply downward pressure to the leg structure to hold the cart in place when the leg structure is rested upon the ground or floor surface such that any vibration of the apparatus during operation of the motor and pump is less likely to cause the apparatus to move about on the wheels.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that the steps shown in the drawing figures may be altered in a variety of ways. For example, the order of the steps may be rearranged, substeps may be performed in parallel, shown steps may be omitted, or other steps may be included, etc.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A portable descaling apparatus for creating a forceful fluid flow through passages of a heat exchanger, the apparatus comprising:
   a cart including:
      a platform having a front, a rear, and a pair of opposite sides, the platform having a forward leg structure;
      a pair of wheels mounted on an axle mounted on the platform, each of the wheels being positioned at one of the sides of the platform, the axle being located on the platform rearwardly of the forward leg structure; and
      a handle mounted on and extending upwardly from the platform, the handle being positioned toward the rear of the platform rearward of the axle;
   a fluid tank mounted on the cart and having an interior configured to hold a quantity of fluid;
   a fluid pump mounted on the cart and being configured to pump fluid from the fluid tank under pressure;
   a pump motor mounted on the cart and being connected to the fluid pump to operate the fluid pump;
   wherein the fluid pump is located on the platform over and in vertical alignment with the forward leg structure, the pump motor being mounted on the fluid pump in a manner such that the pump motor is located over and in a vertical alignment with the fluid pump and also the forward leg structure of the platform to support the weight of the fluid pump and pump motor on the forward leg structure; and
   wherein the fluid tank is positioned on the platform above the axle and at least partially between the wheels with equal portions of the fluid tank being located forward and rearward of the axle such that rearward tilting of the platform shifts a greater portion of the weight of the fluid tank and contents of the fluid tank rearwardly of the axle to balance the weight of the motor and the fluid pump.

2. The apparatus of claim 1 wherein the fluid tank has an upper opening located on a top of the fluid tank, and a cap is removably mounted on the upper opening to close the upper opening.

3. The apparatus of claim 1 wherein the forward leg structure comprises a U-shaped leg member.

4. A descaling system comprising:
   a heat exchanger with a pair of connections in fluid communication with a fluid passage through the heat exchanger, the connections including an inlet connection and an outlet connection; and
   a portable descaling apparatus for creating a forceful fluid flow through passages of the heat exchanger, the apparatus comprising:
      a cart including:
         a platform having a front, a rear, and a pair of opposite sides, the platform having a forward leg structure;
         a pair of wheels mounted on an axle mounted on the platform, each of the wheels being positioned at one of the sides of the platform, the axle being located on the platform rearwardly of the forward leg structure; and a handle mounted on and extending upwardly from the platform, the handle being positioned toward the rear of the platform rearward of the axle;

a fluid tank mounted on the cart and having an interior configured to hold a quantity of fluid, the fluid tank having a tank inlet and a tank outlet;

a fluid pump mounted on the cart and being fluidly connected to the tank outlet to pump fluid from the fluid tank under pressure, the fluid pump having an output;

a pump motor mounted on the cart and being connected to the fluid pump to operate the fluid pump;

an input assembly configured to receive fluid into the apparatus from the heat exchanger during fluid circulation, the input assembly comprising:

an input connector mounted on the cart and being removably connected to the output connection of the heat exchanger to fluidly connect the fluid tank to the heat exchanger; and a conduit fluidly connecting the input connector to the tank inlet; and an output assembly configured to receive fluid from the output of the fluid pump, the output assembly comprising:

an output connector mounted on the cart and being removably connected to the input connection of the heat exchanger to fluidly connect the fluid pump to the heat exchanger; and a conduit fluidly connecting the output connector to the pump outlet;

wherein the fluid pump is located on the platform over and in vertical alignment with the forward leg structure, the pump motor being mounted on the fluid pump in a manner such that the pump motor is located over and in a vertical alignment with the fluid pump and also the forward leg structure of the platform to support the weight of the fluid pump and pump motor on the forward leg structure; and wherein the fluid tank is positioned on the platform above the axle and at least partially between the wheels with equal portions of the fluid tank being located forward and rearward of the axle such that rearward tilting of the platform shifts a greater portion of the weight of the fluid tank and contents of the fluid tank rearwardly of the axle to balance the weight of the motor and the fluid pump.

5. The apparatus of claim 4 wherein the fluid tank has an upper opening located on a top of the fluid tank, and a cap is removably mounted on the upper opening to close the upper opening.

6. The apparatus of claim 4 wherein the forward leg structure comprises a U-shaped leg member.

* * * * *